United States Patent [19]

McBridge et al.

[11] Patent Number: 5,000,644
[45] Date of Patent: Mar. 19, 1991

[54] BIN INLET DEFLECTOR FOR A GRANULATOR

[75] Inventors: Thomas D. McBridge, Shrewsbury, Mass.; Jean B. Lamoureux, Woonsocket, R.I.; Edward P. Lariviere, East Douglas, Mass.

[73] Assignee: Nelmor Company, Inc., North Uxbridge, Mass.

[21] Appl. No.: 532,449

[22] Filed: Jun. 4, 1990

[51] Int. Cl.⁵ .................. A47J 42/14; B65G 67/06; B02C 13/06
[52] U.S. Cl. ............................. 414/292; 241/100
[58] Field of Search ............... 414/287, 292, 293, 288, 414/299; 141/363, 364, 365; 241/100

[56] References Cited

U.S. PATENT DOCUMENTS

| | | | |
|---|---|---|---|
| 2,233,365 | 2/1941 | Kerr | 414/293 |
| 3,171,449 | 3/1965 | Ellms et al. | 141/364 X |
| 4,143,823 | 3/1979 | Judson, Jr. | 241/100 X |
| 4,280,666 | 7/1981 | Jones | 241/100 X |
| 4,370,084 | 1/1983 | Weaver | 414/292 |
| 4,621,774 | 11/1986 | Rahill | 241/100 X |
| 4,637,560 | 1/1987 | Goldhammer | 241/100 |
| 4,942,432 | 7/1990 | Mort et al. | 141/363 X |

FOREIGN PATENT DOCUMENTS

| | | | |
|---|---|---|---|
| 1283486 | 11/1968 | Fed. Rep. of Germany | 241/100 |
| 2807046 | 8/1979 | Fed. Rep. of Germany | 414/293 |
| 795563 | 1/1981 | U.S.S.R. | 241/100 |
| 1443964 | 12/1988 | U.S.S.R. | 241/100 |

Primary Examiner—Robert J. Spar
Assistant Examiner—Robert S. Katz
Attorney, Agent, or Firm—Samuels, Gauthier & Stevens

[57] ABSTRACT

A bin inlet deflector for a granulator wherein the deflector is secured to the screen chamber and encloses the bin to ensure that all granulate is received in the bin and not outside the bin.

1 Claim, 2 Drawing Sheets

BIN INLET DEFLECTOR FOR A GRANULATOR

BACKGROUND AND BRIEF SUMMARY OF THE INVENTION

Many plastics granulators, especially in the smaller sizes, have bins which collect the granulated product as it discharges from the cutting area. Machine operators slide these bins out and empty their contents as they become full. A problem common to all granulators with bins is that some of the granulate does not end up in the bin. Even though most manufacturers provide baffles to direct this material toward the center of the bin opening, the violent action caused by the cutting process causes a significant amount of granulated particles to miss the bin. As a result, granulate piles up inside the base of the granulator housing as well as on the floor. This is very objectionable from an environmental standpoint to some customers. This also creates waste, since any product which is not kept clean cannot be reprocessed. In addition, the spillage sometimes is so bad that it jams the bin and prevents the operator from removing it.

The present invention embodies a bin design which ensures that all granulate is received in the bin and which prevents jamming.

A device embodying the invention is a unitary deflector, cut and formed from light gauge steel sheet. The deflector bolts directly to the bottom of the granulator's screen chamber (where the product exits the cutting area) and has two vertical baffles which extend downwardly into the bin. Each of these baffles is positioned about one-fourth inch inside its respective bin side-wall. To enable the bin to slide in and out of the base, two narrow slots are formed in the top corners of the back wall. The deflector also prevents any upward escape by the granulate, because the top is closed off between both vertical baffles.

The close spacing between the baffles and the bin walls and the protrusion (over-lap) of the baffle into the bin causes this deflector to be extremely successful in preventing spillage.

DESCRIPTION OF THE PREFERRED EMBODIMENT(S)

Figure 1:
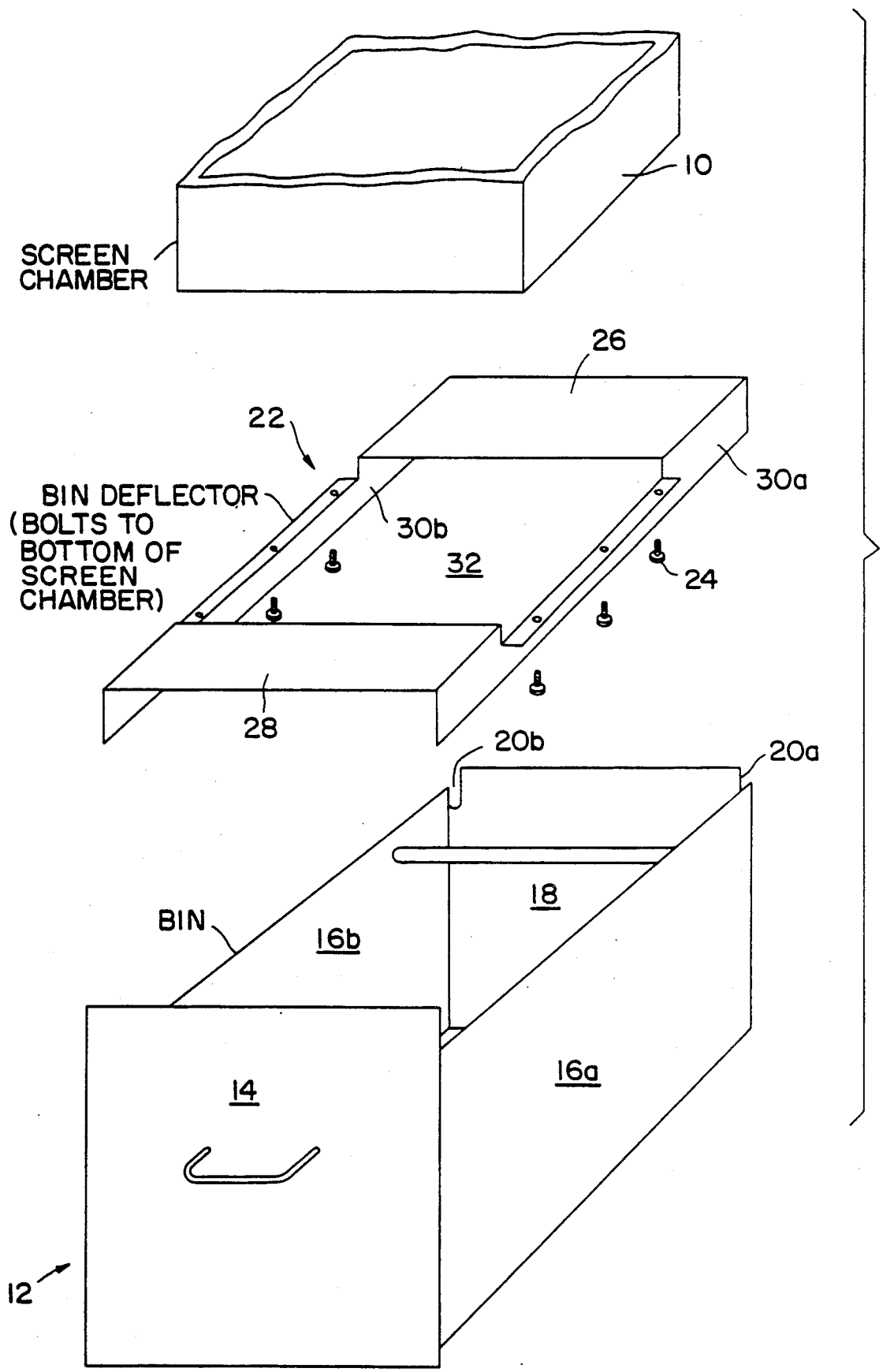
FIG. 1 is a telescopic perspective view of a bin deflector embodying the invention.

Referring to FIG. 1, the lower portion of a screen chamber 10 of the granulator is shown. A bin 12 is similar to a prior art bin comprising a front wall 14, side walls 16a and 16b and a rear wall 18. However, the rear wall 18 includes two notches 20a and 20b formed therein.

A deflector embodying the invention is shown at 22 and is secured to the underside of the screen chamber 10 by fastening members 24. The deflector includes a rearward section 26 and a forward section 28. These sections are joined by vertically depending baffles 30a and 30b. The baffles are received in the grooves 20a and 20b respectively.

The deflector further includes an opening 32 defined by the rearward and forward portions 26 and 28 and the baffles 30a and 30b. This opening is coextensive with the opening in the bottom of the screen chamber. The baffle 30a is slightly spaced apart from the inner surface of the wall 16a and the baffle 30b is slightly spaced apart from the inner surface of the wall 16b.

Figure 2:
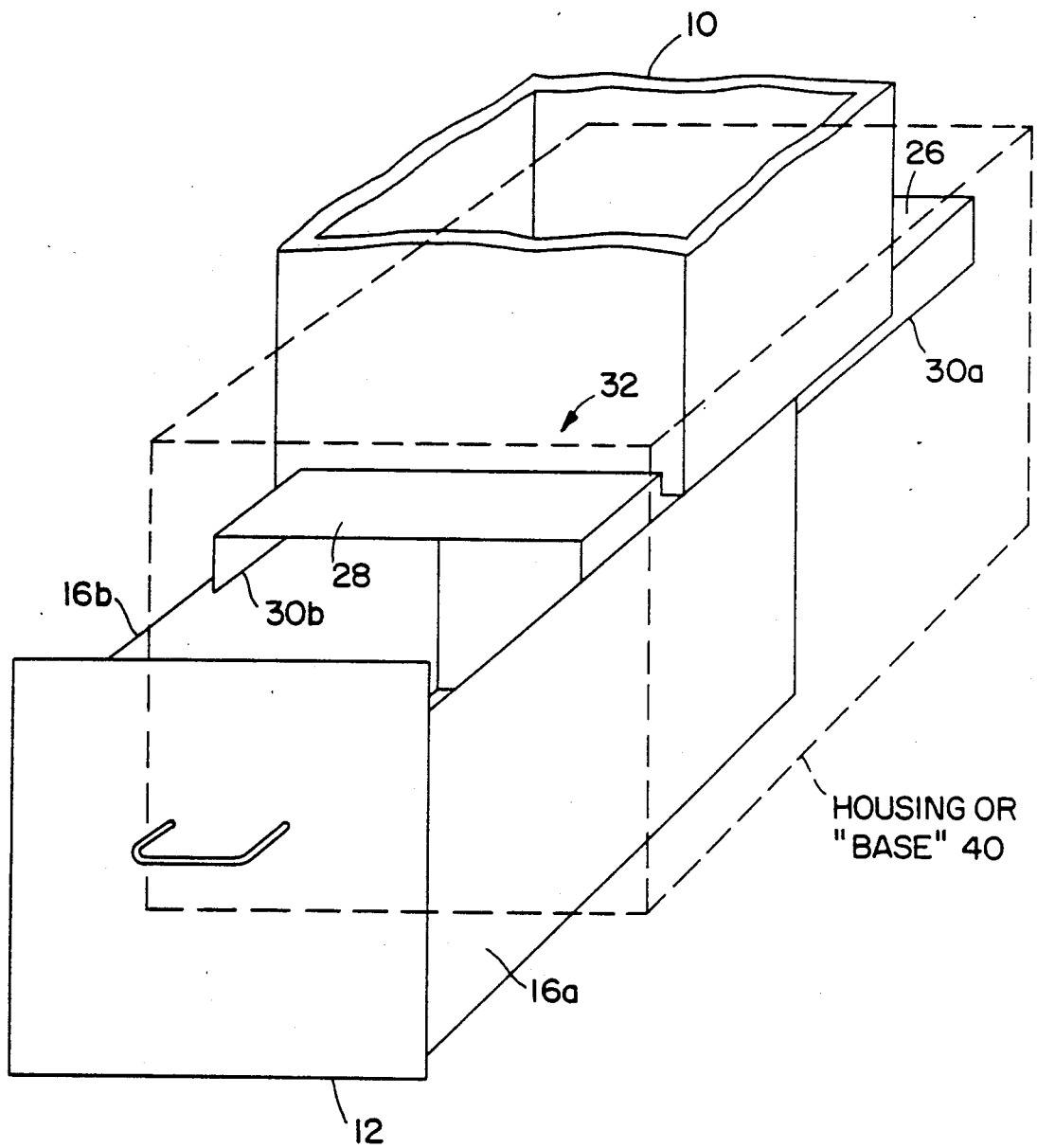
FIG. 2 is a perspective view of the drawer of the bin partly removed from the granulator.

As shown in FIG. 2, the bin is received in a housing 40, shown schematically in dotted lines, which housing is a normal part of the granulator. When the bin 12 is in its closed position, the only communication between the screen chamber and the bin is through the opening 32. Granulate is prevented from falling into the housing because entry of granulate into the housing is prevented by the rearward and forward portions 26 and 28 and baffles 30a and 30b.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. In a granulator with a housing, the granulator having a removable bin with two side walls and a rear wall in the granulator housing to receive granulated material, the granulator including a screen chamber, the improvement which comprises:

a deflector secured to the screen chamber to seal the bin from the housing, the deflector having an opening coextensive with the chamber, a first portion extending from a chamber wall to the back of the bin and a second portion extending from the chamber to the front of the bin, and two baffles extending downwardly from and joining the sections, whereby the baffles slide into grooves formed in the rear wall of the bin and are received inside the side walls of the bin in order to assure that the granulated material goes into the bin.

* * * * *

UNITED STATES PATENT AND TRADEMARK OFFICE
CERTIFICATE OF CORRECTION

PATENT NO. : 5,000,644

DATED : 19 March 1991

INVENTOR(S) : Thomas D. McBride, Jean B. Lamoureux, Edward P. Lariviere

It is certified that error appears in the above—identified patent and that said Letters Patent is hereby corrected as shown below:

On the title page:

Under item [19], should read "McBride" etal

On the title page, item [75], first line should read Inventors: Thomas D. McBride, Shrewsbury.

Signed and Sealed this

Eighth Day of December, 1992

Attest:

DOUGLAS B. COMER

Attesting Officer

Acting Commissioner of Patents and Trademarks